(12) United States Patent
Thiele et al.

(10) Patent No.: US 7,545,658 B2
(45) Date of Patent: Jun. 9, 2009

(54) DC-DC BOOST CONVERTER WITH A CHARGE PUMP

(75) Inventors: Gerhard Thiele, Munich (DE); Erich Bayer, Thonhausen (DE)

(73) Assignee: Texas Instruments Deutschland GmbH, Dallas, TX (US)

( * ) Notice: Subject to any disclaimer, the term of this patent is extended or adjusted under 35 U.S.C. 154(b) by 73 days.

(21) Appl. No.: 11/864,332

(22) Filed: Sep. 28, 2007

(65) Prior Publication Data

US 2008/0084720 A1 Apr. 10, 2008

(30) Foreign Application Priority Data

Sep. 29, 2006 (DE) .................. 10 2006 046 387

(51) Int. Cl.
*H02M 3/18* (2006.01)

(52) U.S. Cl. ..................... 363/60; 363/59; 327/536; 307/110

(58) Field of Classification Search ............ 363/59, 363/60; 327/536; 307/110
See application file for complete search history.

(56) References Cited

U.S. PATENT DOCUMENTS

| 5,111,375 | A | * | 5/1992 | Marshall ................. 363/60 |
| 5,574,634 | A | * | 11/1996 | Parlour et al. ............ 363/59 |
| 5,684,682 | A | * | 11/1997 | Zhong et al. ............. 363/59 |
| 6,215,676 | B1 | * | 4/2001 | Pierson .................. 363/59 |
| 6,275,395 | B1 | * | 8/2001 | Inn et al. ................ 363/60 |
| 6,661,683 | B2 | * | 12/2003 | Botker et al. ............. 363/60 |

2003/0184361 A1 10/2003 Tanimoto

FOREIGN PATENT DOCUMENTS

DE 199 62 523 8/2001

* cited by examiner

*Primary Examiner*—Bao Q Vu
(74) *Attorney, Agent, or Firm*—John J. Patti; Wade J. Brady, III; Frederick J. Telecky, Jr.

(57) ABSTRACT

A DC-DC boost converter comprises a charge pump selectively operating in a voltage doubler or in a voltage tripler mode. A switching arrangement connects the charge pump to an input voltage terminal in a charge phase and to an output voltage terminal in a discharge phase. A controllable current source is connected in series with the charge pump in the discharge phase and an error amplifier has a first input connected to a reference voltage, a second input connected to the output voltage terminal and an output connected to a control input of the controllable current source. The converter further comprises a mode changeover circuit with a first comparator having a first input connected to the output of the error amplifier and a second input connected to a first threshold voltage source. A second comparator has a first input connected to the output of the error amplifier and a second input connected to a second threshold voltage source. A flip-flop has its set input connected to the output of the first comparator, its reset input connected to the output of the second comparator. The flip-flop has its output connected to the switch arrangement to switch the charge pump from doubler mode to tripler mode when the voltage at the output of the error amplifier exceeds the second threshold voltage and back to doubler mode when the output voltage at the error amplifier drops below the first threshold voltage.

14 Claims, 4 Drawing Sheets

DC-DC BOOST CONVERTER WITH A CHARGE PUMP

The invention relates to a DC-DC boost converter with a charge pump.

BACKGROUND

A charge pump is a basic circuit arrangement that charges a capacitor to an input voltage in a charge phase and discharges the capacitor into a load in a discharge phase. A switching arrangement connects the capacitor in series with the input voltage source so that the output voltage applied to the load is twice the input voltage. With the same concept, plural capacitors can each be charged to the input voltage in the charge phase and connected in series with each other and with the input voltage source in the discharge phase. When the output voltage of the charge pump is twice the input voltage, the charge pump is referred to as a voltage doubler. When the output voltage is three times the input voltage, the charge pump is a DC-DC boost converter comprising a charge pump voltage tripler.

With an appropriate design of the charge pump and of the associated switching arrangement, it is possible to build a DC-DC boost converter capable of operating in either of a voltage doubler or voltage tripler mode. This kind of converter is needed in certain mobile applications where the input voltage source is a battery which has a variable voltage over lifetime or charge condition, and also where the required supply voltage may vary. Typical applications of this kind are LCD or TFT displays. In a converter of this kind, the charge pump operates in the doubler mode as long as the required supply voltage is achieved by doubling the input voltage from the battery. When the required supply voltage exceeds twice the battery voltage, the charge pump is switched to the tripler mode.

While the charge pump is in the tripler mode, the requirements for the output voltage may change. If a new requirement is for an output voltage that can be achieved in the doubler mode, and the discharge pump is in the tripler mode, it is not possible without a complicated load prediction mechanism to switch back to the doubler mode. In that case, however, the converter must regulate the tripled voltage down to the required output voltage, thereby wasting a lot of energy.

SUMMARY

The invention provides a DC-DC boost converter with a charge pump selectively operating in a voltage doubler mode or voltage tripler mode, and that can be switched back from tripler to doubler mode without the need for a complicated load prediction mechanism.

Specifically, described embodiments of the invention provide a DC-DC boost converter with a charge pump selectively operating in a voltage doubler mode or in a voltage tripler mode. A switching arrangement connects the charge pump to an input voltage terminal in a charge phase and to an output voltage terminal in a discharge phase. A controllable current source is connected in series with the charge pump in the discharge phase. An error amplifier has a first input connected to a reference voltage, a second input connected to the output voltage terminal and an output connected to a control input of the controllable current source. The converter furthermore has a mode changeover circuit with a pair of comparators. Non-symmetrical buffers may also be used instead of comparators.

In a described embodiment, a first comparator has a first input connected to the output of the error amplifier and a second input connected to a first threshold voltage source. A second comparator has a first input connected to the output of the error amplifier and a second input connected to a second threshold voltage source, the second threshold being substantially higher than the first. A flip-flop has a "set" input connected to the output of the first comparator, a "reset" input connected to the output of the second comparator and an output connected to the switch arrangement, to switch the charge pump from doubler mode to tripler mode when the voltage at the output of the error amplifier exceeds the second threshold voltage and back to doubler mode when the output voltage at the error amplifier drops below the first threshold voltage. Because the output voltage of the error amplifier contains the real load information, there is no need for a load prediction mechanism.

BRIEF DESCRIPTION OF THE DRAWINGS

Further advantages and characteristics of the invention will become apparent from the description of example embodiments below, taken together with the accompanying drawings, wherein.

DETAILED DESCRIPTION OF EXAMPLE EMBODIMENTS

Figure 1:
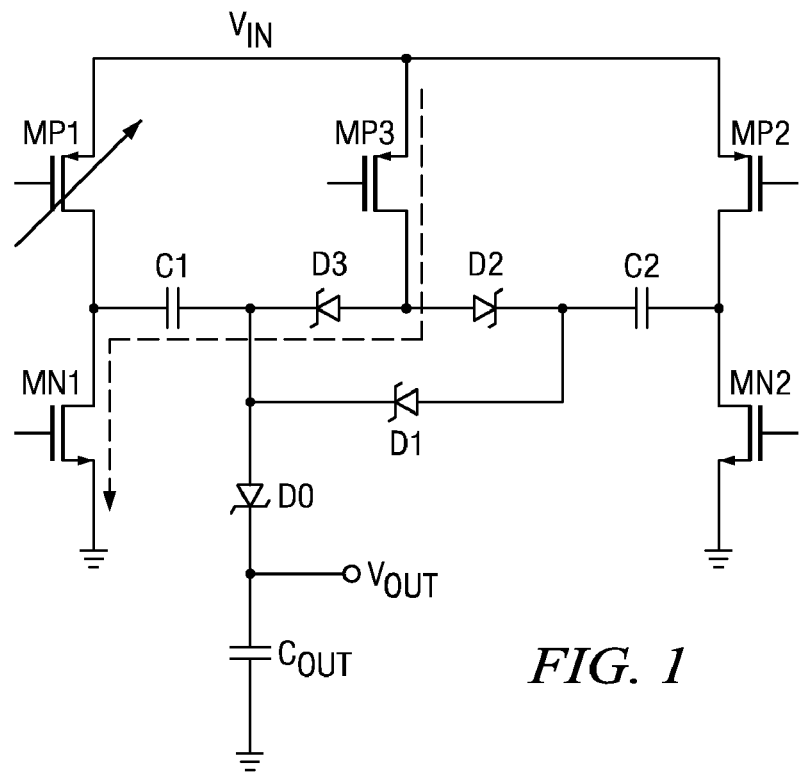
FIG. 1 illustrates a charge pump in voltage doubler mode, showing the charge phase.
Figure 2:
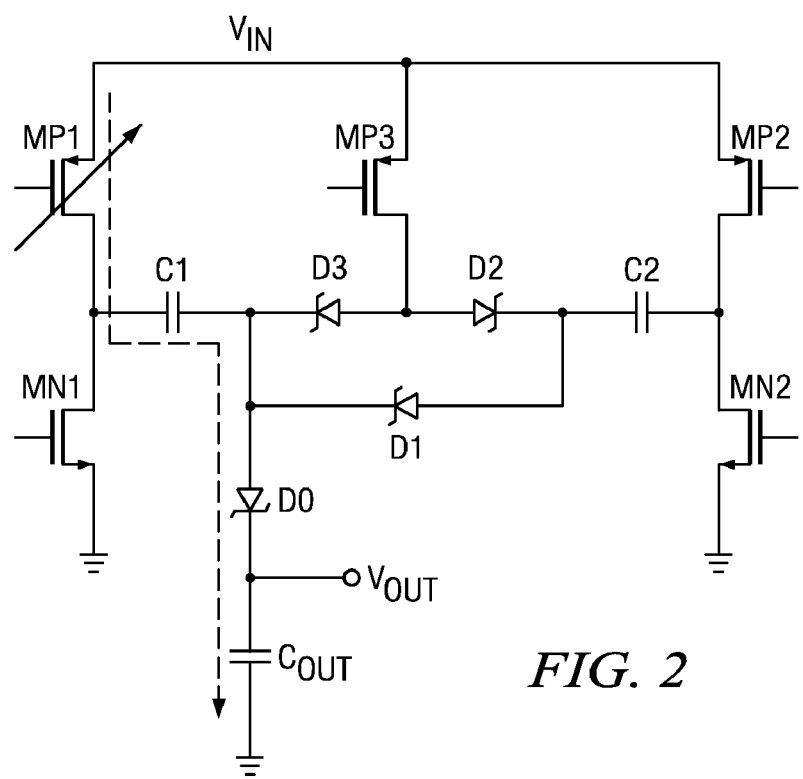
FIG. 2 illustrates a charge pump in voltage doubler mode, showing the discharge phase.
Figure 3:
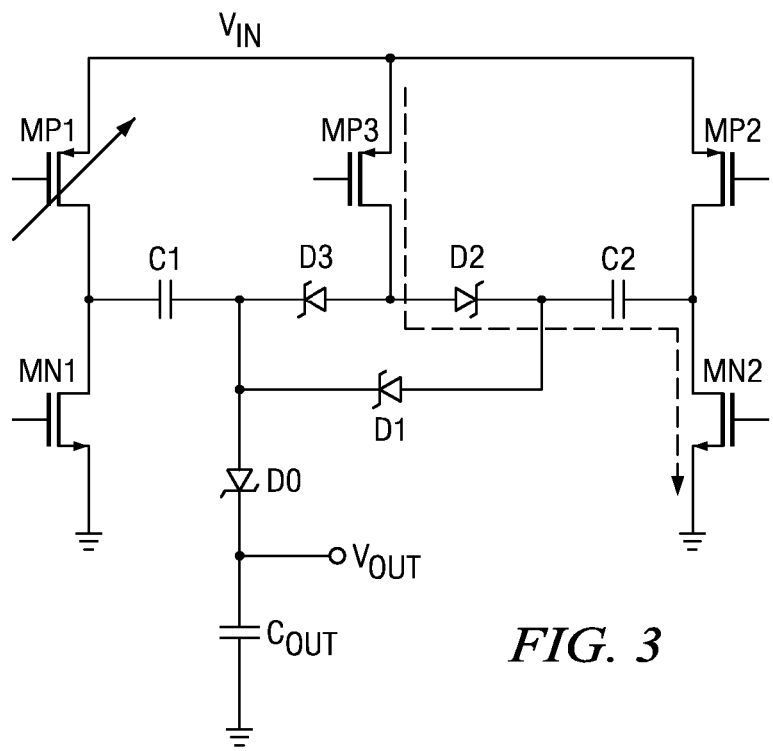
FIG. 3 illustrates a charge pump in tripler mode, showing a charge phase of a first capacitor.
Figure 4:
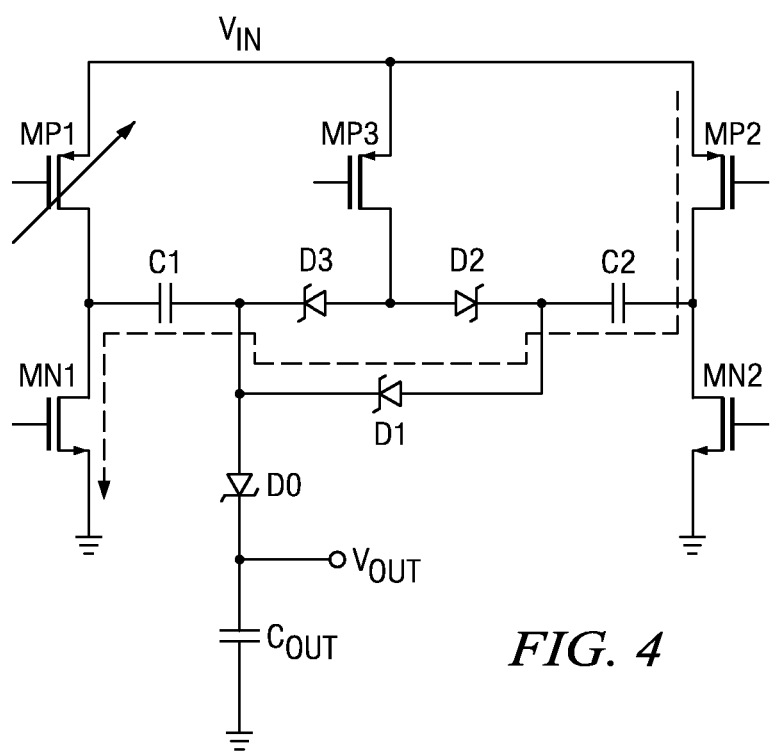
FIG. 4 illustrates a charge pump in tripler mode, showing a charge phase of a second capacitor.
Figure 5:
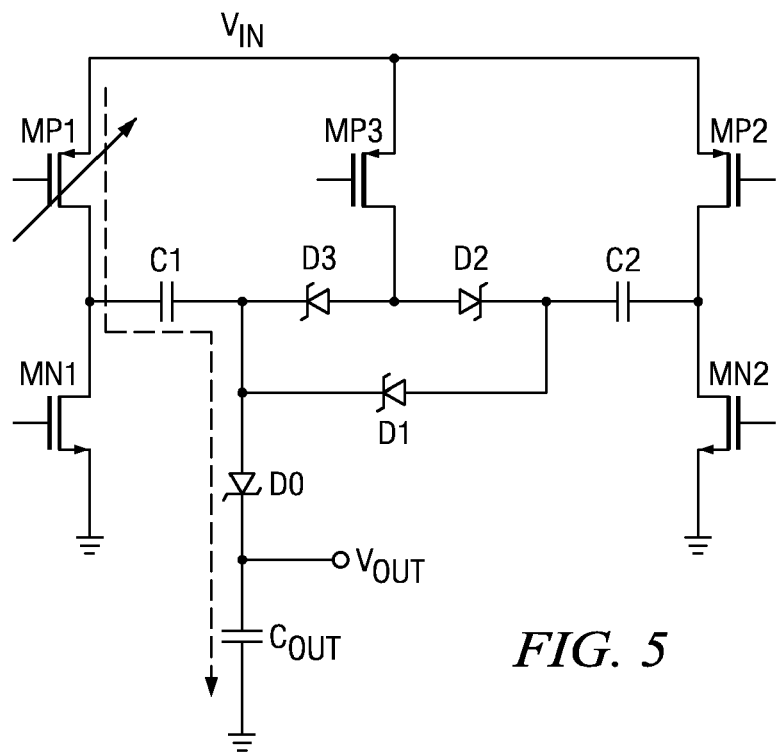
FIG. 5 illustrates a charge pump in tripler mode, showing the discharge phase.

FIGS. 1 to 5 show a charge pump which can operate in either a voltage doubling or voltage tripling mode. A p-type MOS transistor MP1, which acts as a current source, is connected in parallel with another p-type MOS transistor MP3. The transistor MP3 is a normally ON switch. The transistors MP1 and MP3 are both connected with another p-type MOS transistor MP2. The source terminals of the transistors MP1, MP2 and MP3 are all interconnected at a voltage input terminal $V_{in}$. A capacitor C1 and a diode D3 are connected in series between the drain terminals of the transistors MP1 and MP3, such that the diode D3 is biased in the direction from the transistor MP3 to the transistor MP1. A diode D2 and a capacitor C2 are connected in series between the drain terminals of the transistors MP3 and MP2, such that the diode D2 is biased in the direction from MP3 to MP2. The drain terminal of the transistor MP2 and one plate of the capacitor C2 are also connected to the drain terminal of an n-type MOS transistor MN2. The source of the transistor MN2 is connected to ground. A diode D1 is connected in parallel with the diodes D2 and D3. The anode of a diode D0 is connected to a node between one plate of the capacitor C1 and the cathode of the diode D3, and is also connected to the cathode of the diode D1. The cathode of the diode D0 is connected to a capacitor $C_{out}$ and a voltage output terminal $V_{out}$. The capacitor $C_{out}$ is also connected to ground. An n-type MOS transistor MN1 has a drain terminal connected to the drain terminal of the transistor MP1 and to the plate of the capacitor C1 that is not connected to the cathode of the diode D3. The source terminal of the transistor MN1 is connected to ground.

In the charge phase (see FIG. 1), a current flows through the transistor MP3 and through the diode D3 in the forward bias direction, through the capacitor C1, therefore charging the capacitor C1, then through the transistor MN1 to ground. In the doubler mode, the switches implemented by the transistors MP2 and MN2 are OFF, such that no current flows through the diode D2 and into the capacitor C2. The charged capacitor C1, when added to the voltage $V_{in}$ doubles the supply voltage $V_{in}$, and the charge pump is therefore said to be in doubler mode. In the discharge phase (see FIG. 2), the transistor MN1 is switched OFF and the transistor MP1 is biased to a conductive state, so that the stored charge on the capacitor C1 is pulled up towards the input voltage $V_{in}$, thereby charging the capacitor $C_{out}$ to twice the input voltage.

In some applications, it is required that the supply voltage be tripled. In this case, the capacitor C2 is charged first. To charge the capacitor C2, the switch MN1 is OFF and current flows through the normally ON switch MP3, through the diode D2 in a forward bias direction, through the capacitor C2, through the ON switch MN2, and down to ground (see FIG. 3). The switch MP2 is OFF at this point. To charge the capacitor C1, the switch MP2 is ON and the switch MN2 is OFF. The switch MN1 is also ON. Current then flows through the transistor MP2, and the capacitor C2 discharges through the diode D1. The resultant current from the discharge of C2 then charges C1, as the current flows through the transistor MN1 (see FIG. 4). This means that the voltage at C1 is now twice the voltage of the supply $V_{in}$. The capacitor C1 is then discharged out to the output capacitor $C_{out}$ by switching the transistors MN1 and MP2 to OFF, and switching the transistor MN2 to ON, and biasing transistor MP1 to a conductive state so that the capacitor C1 discharges through the diode D0 onto the capacitor $C_{out}$ (see FIG. 5). The resultant tripled voltage is then available at the voltage output terminal $V_{out}$.

Figure 6:
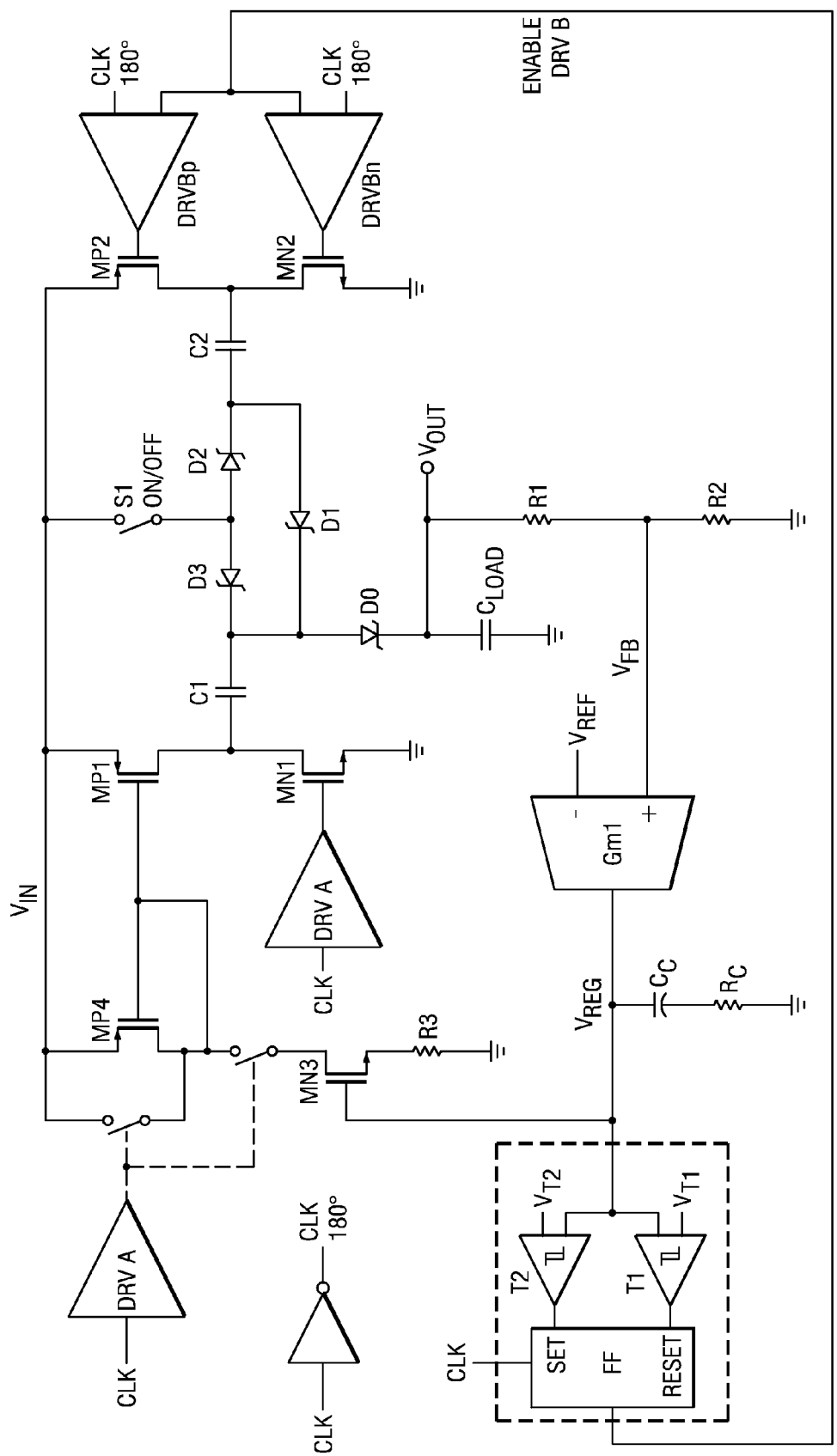
FIG. 6 is a DC-DC boost converter comprising a charge pump according to an embodiment of the principles of the invention.

A DC-DC boost converter comprising a charge pump is shown in FIG. 6, which can achieve the switching between doubling and tripling modes of the charge pump. The charge pump circuit is the same as that shown in FIGS. 1 to 5, with a voltage input terminal $V_{in}$ and a voltage output terminal $V_{out}$. However, the transistor MP3, which implements the normally ON switch, is shown in FIG. 6 as S1.

The gate terminal of the transistor MP1 is interconnected with the gate terminal of a p-type MOS transistor MP4, which is diode connected. Current through the transistor MP4 is controlled by an n-type transistor MN3 connected in series with a resistor R3. The transistors MP4 and MP1 form a current mirror, such that the current input to the transistor MP4 is copied by the transistor MP1 and the transistor MP1 then acts as a current source, which is driven by a clock signal CLK, such that the current source is controllable. The same clock signal CLK also controls the switch implemented by the transistor MN1 and is input to the gate terminal of the transistor MN1. The switches implemented in the transistors MP2 and MN2 are driven by the outputs of gates DRVBp and DRVBn, respectively. A clock signal CLK 180°, which has exactly the inverse phase to the clock signal CLK, is input to a first input of each of the gates DRVBp and DRVBn. The cathode of the diode D0 and the voltage output terminal $V_{out}$ are connected to the positive input of an error amplifier Gml, via a resistor R1. A resistor R2 is connected between the positive input of the error amplifier Gml and ground. A capacitor $C_{LOAD}$ (corresponding to the capacitor $C_{out}$ shown in FIGS. 1 to 5) is also connected between a point connecting the cathode of the diode D0, the output terminal $V_{out}$, the input terminal of the resistor R1, and ground. The resistors R1 and R2 form a feedback divider, which is operable to provide a feedback voltage $V_{FB}$ proportional to and representative of the output voltage at the output terminal $V_{out}$. The voltage $V_{FB}$ is input to the positive terminal of the error amplifier Gml and the reference voltage $V_{ref}$ is input to the negative terminal of the error amplifier.

The output $V_{REG}$ of the error amplifier Gml is then input to the gate of transistor MN3, to first inputs of a first comparator T1 and a second comparator T2. The comparators T1 and T2 are implemented as non-symmetrical buffers. A capacitor Cc and a resistor Rc are both connected in series between the output of the error amplifier Gml and ground. The comparator T1 also has a second input operable to receive an input voltage $V_{T1}$, which is the threshold voltage of the comparator T1. The comparator T2 also has a second input operable to receive an input voltage $V_{T2}$, which is the threshold voltage of the comparator T2.

The outputs of the comparators T1 and T2 are input to a flip-flop FF. The output of the comparator T2 is input to the SET input of the flip-flop FF and the output of the comparator T1 is connected to the RESET input of the flip-flop FF. The clock signal CLK is also input to the flip-flop FF. The output of the flip-flop FF is connected to second inputs of the gates DRVBp and DRVBn which drive the transistors MP2, and MN2, respectively.

Figure 7:
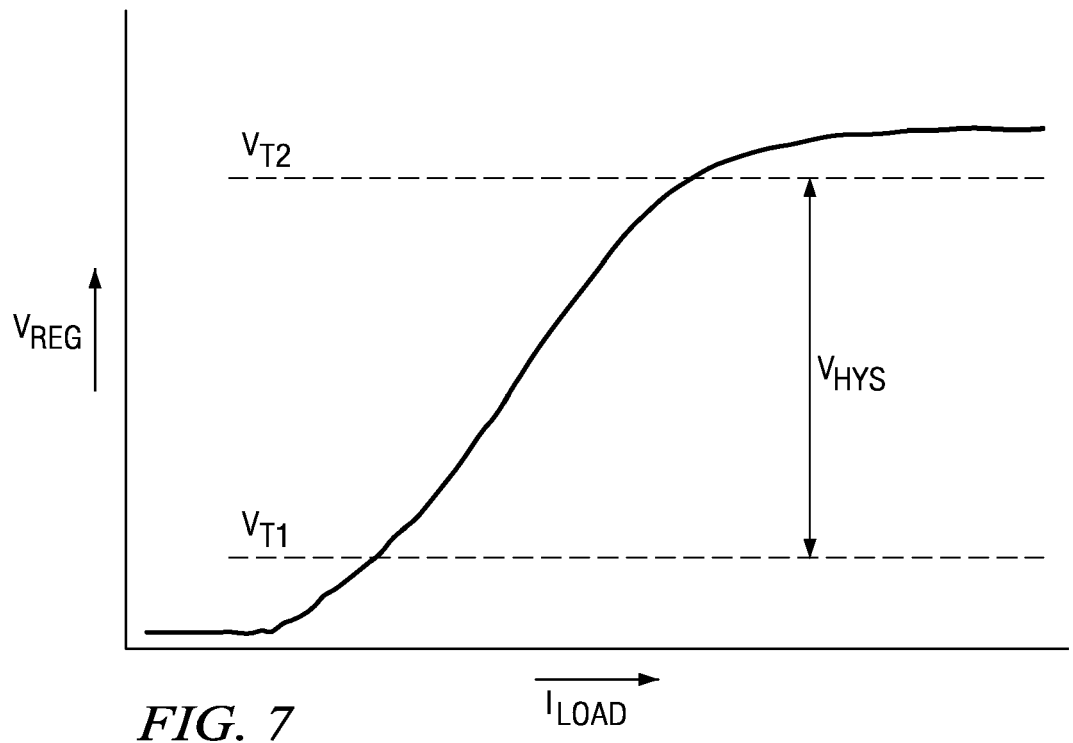
FIG. 7 is a graph of the voltage output of an error amplifier vs. load current in a DC-DC boost converter comprising a charge pump according to an embodiment of the principles of the invention.

The voltage $V_{FB}$ representative of the output from the charge pump is input to the positive terminal of the error amplifier Gml and is compared with the reference voltage $V_{ref}$, which is input to the negative terminal of the error amplifier. The error amplifier Gml compares the two voltages input to the positive and negative inputs, and outputs a resultant voltage $V_{REG}$. The voltage $V_{REG}$ controls the current through the transistors MN3 and MP4, and hence through transistor MP1, and is also input to the first input of each of the two comparators T1 and T2, respectively. A graph of $V_{REG}$, $V_{T1}$ and $V_{T2}$ against the load current $I_{LOAD}$ is shown in FIG. 7.

The output voltage $V_{REG}$ of the error amplifier Gml controls the transistor MN3. The transistor MN3 works as a voltage-to-current converter in the output stage. The current through R3 is mirrored via the transistor MP4 with a current amplification factor k to the transistor MP1, which is a power transistor. Dependent on the output load of the charge pump, the gate-source voltage of MP1 is controlled. The transistor MN1 and the switched current mirror implemented by the transistors MP4 and MP1 is driven by the clock signal CLK via the gate DRV A. The switches implemented by the transistors MP2 and MN2 are driven by the gates DRVBp and DRVBn with the phase shift clock CLK 180°.

To switch the charge pump from doubler mode to tripler mode, and vice versa, load prediction is not necessary because the output voltage $V_{REG}$ of the error amplifier Gml is used to determine whether the charge pump should be switched from doubler to tripler mode, and vice versa, and the output voltage $V_{REG}$ contains the real load information. The threshold voltages $V_{T1}$ and $V_{T2}$ input to the comparators T1 and T2, respectively, which determine whether the mode of the charge pump is changed from doubler mode to tripler mode, are related directly to the load current $I_{LOAD}$ (see FIG. 7), with the relationship:

$$I_{LOAD} = k * 1/R3 * dV_{REG}$$

The comparators T1 and T2 compare the output $V_{REG}$ of the error amplifier Gm1 with the threshold voltages $V_{T1}$ and $V_{T2}$, respectively, and provide an output that sets or resets the flip-flop FF. The flip-flop stores this information and switches synchronously to clock the enable signals of the gates DRVBp and DRVBn, which drive the transistors MP2 and MN2, respectively. In tripler mode the gates DRVBp and DRVBn are enabled and in doubler mode the gates DRVBp and DRVBn are disabled.

TABLE 1

| Actual Mode | $V_{REG}$ | Set Mode |
| --- | --- | --- |
| Doubler | $<V_{T2}$ | Doubler |
| Doubler | $>V_{T2}$ | Tripler |
| Tripler | $>V_{T1}$ | Tripler |
| Tripler | $<V_{T1}$ | Doubler |

Table 1 shows the conditions necessary for switching the charge pump from doubler to tripler mode, and vice versa. When the charge pump is operating in doubler mode and $V_{REG}$ is less than $V_{T2}$, then the charge pump remains in doubler mode but if it is determined that $V_{REG}$ is greater than $V_{T2}$, then the gates DRVBp and DRVBn are enabled and the charge pump is switched to tripler mode. When the charge pump is operating in tripler mode and $V_{REG}$ is greater than $V_{T1}$, the gates DRVBp and DRVBn remain enabled and the charge pump stays in tripler mode. If, however, $V_{REG}$ is less than $V_{T1}$, then the gates DRVBp and DRVBn are disabled and the charge pump is switched to doubler mode. To avoid ringing between doubler and tripler modes, there is a hysteresis $V_{HYS}$ between the threshold voltages $V_{T2}$ and $V_{T1}$, as shown in FIG. 7. The charge pump can therefore be switched between doubler and tripler modes within the same application, according to voltage requirements.

Although the invention has been described hereinabove with reference to a specific embodiment, it is not limited to this embodiment and no doubt further alternatives will occur to the skilled person that lie within the scope of the invention as claimed.

What is claimed is:

1. A DC-DC boost converter, comprising:
    a charge pump selectively operating in a voltage doubler mode or in a voltage tripler mode;
    a switching arrangement connecting the charge pump to an input voltage terminal in a charge phase and to an output voltage terminal in a discharge phase;
    a controllable current source connected in series with the charge pump in the discharge phase; and
    an error amplifier having a first input connected to a reference voltage, a second input connected to the output voltage terminal, and an output connected to a control input of the controllable current source;
    and further comprising a mode changeover circuit including:
    a first comparator having a first input connected to the output of the error amplifier and a second input connected to a first threshold voltage source;
    a second comparator having a first input connected to the output of the error amplifier and a second input connected to a second threshold voltage source; and
    a flip-flop having a RESET input connected to the output of the first comparator, a SET input connected to the output of the second comparator, and an output connected to the switching arrangement to switch the charge pump from the voltage doubler mode to the voltage tripler mode when the voltage at the output of the error amplifier exceeds the second threshold voltage, and back to the voltage doubler mode when the output voltage at the error amplifier drops below the first threshold voltage.

2. The converter according to claim 1, wherein the controllable current source is formed by a current mirror arrangement which includes a diode-connected MOS transistor in series with a current control MOS transistor between the input voltage terminal and ground; and a power MOS transistor that mirrors the current through the diode-connected MOS transistor, the gate of the current control MOS transistor being connected to the output of the error amplifier.

3. The converter according to claim 2, wherein the switching arrangement is driven by a clock signal.

4. The converter according to claim 3, wherein the switching arrangement driven by the clock signal disables the controllable current source in the charge phase.

5. The converter according to claim 4, wherein the charge pump comprises:
    a first pair of complementary MOS transistors connected between the input voltage terminal and ground;
    a second pair of complementary MOS transistors connected in series between the input voltage terminal and ground;
    a normally closed switch connected to the input voltage terminal;
    a first charge accumulating capacitor having one electrode connected to the node between the first pair of MOS transistors and the other connected to the normally closed switch through a first diode;
    a second charge accumulating capacitor having one electrode connected to the node between the second pair of MOS transistors and the other connected to the normally closed switch through a second diode; and
    a third diode connecting the first and second charge accumulating capacitors in series.

6. The converter according to claim 5, wherein the normally closed switch is a p-type MOS transistor.

7. The converter according to claim 6, wherein the charge pump further comprises a fourth diode connecting the first charge accumulating capacitor to a load capacitor.

8. The converter according to claim 5, wherein the charge pump further comprises a fourth diode connecting the first charge accumulating capacitor to a load capacitor.

9. The converter according to claim 3, wherein the charge pump comprises:
    a first pair of complementary MOS transistors connected between the input voltage terminal and ground;
    a second pair of complementary MOS transistors connected in series between the input voltage terminal and ground;
    a normally closed switch connected to the input voltage terminal;
    a first charge accumulating capacitor having one electrode connected to the node between the first pair of MOS transistors and the other connected to the normally closed switch through a first diode;
    a second charge accumulating capacitor having one electrode connected to the node between the second pair of MOS transistors and the other connected to the normally closed switch through a second diode; and
    a third diode connecting the first and second charge accumulating capacitors in series.

10. The converter according to claim 2, wherein the charge pump comprises:
    a first pair of complementary MOS transistors connected between the input voltage terminal and ground;

a second pair of complementary MOS transistors connected in series between the input voltage terminal and ground;

a normally closed switch connected to the input voltage terminal;

a first charge accumulating capacitor having one electrode connected to the node between the first pair of MOS transistors and the other connected to the normally closed switch through a first diode;

a second charge accumulating capacitor having one electrode connected to the node between the second pair of MOS transistors and the other connected to the normally closed switch through a second diode; and a third diode connecting the first and second charge accumulating capacitors in series.

11. The converter according to claim 10, wherein the switching arrangement is driven by a clock signal.

12. The converter according to claim 1, wherein the charge pump comprises:

a first pair of complementary MOS transistors connected between the input voltage terminal and ground;

a second pair of complementary MOS transistors connected in series between the input voltage terminal and ground;

a normally closed switch connected to the input voltage terminal;

a first charge accumulating capacitor having one electrode connected to the node between the first pair of MOS transistors and the other connected to the normally closed switch through a first diode;

a second charge accumulating capacitor having one electrode connected to the node between the second pair of MOS transistors and the other connected to the normally closed switch through a second diode; and a third diode connecting the first and second charge accumulating capacitors in series.

13. The converter according to claim 12, wherein the switching arrangement is driven by a clock signal.

14. The converter according to claim 1, wherein the switching arrangement is driven by a clock signal.

* * * * *